United States Patent
Liu

(10) Patent No.: US 12,480,019 B2
(45) Date of Patent: Nov. 25, 2025

(54) AMINATED PHOSPHORENE-BASED FLAME-RETARDANT WATERBORNE POLYURETHANE COATING AND PREPARATION METHOD THEREOF

(71) Applicant: Guangdong Horun New Material Co., Ltd., Dongguan (CN)

(72) Inventor: Shengquan Liu, Dongguan (CN)

(73) Assignee: Guangdong Horun New Material Co., Ltd., Dongguan (CN)

( * ) Notice: Subject to any disclaimer, the term of this patent is extended or adjusted under 35 U.S.C. 154(b) by 636 days.

(21) Appl. No.: 17/945,205

(22) Filed: Sep. 15, 2022

(65) Prior Publication Data

US 2023/0041786 A1  Feb. 9, 2023

(30) Foreign Application Priority Data

Sep. 15, 2021 (CN) .......................... 202111079394.0

(51) Int. Cl.
| | | |
|---|---|---|
| C09D 175/06 | (2006.01) | |
| C09D 5/18 | (2006.01) | |
| C09D 7/61 | (2018.01) | |

(52) U.S. Cl.
CPC ............. *C09D 175/06* (2013.01); *C09D 5/18* (2013.01); *C09D 7/61* (2018.01)

(58) Field of Classification Search
CPC ...... C09D 175/06; C09D 5/18; C09D 175/04; C08K 2003/026; C08G 18/10; C08G 18/12; C08G 18/288
See application file for complete search history.

(56) References Cited

U.S. PATENT DOCUMENTS

2018/0240607 A1  8/2018  Tsai et al.

FOREIGN PATENT DOCUMENTS

| CN | 102250309 A | 11/2011 |
|---|---|---|
| CN | 104530951 A | 4/2015 |
| CN | 104530952 A | 4/2015 |
| CN | 104974324 A | 10/2015 |
| CN | 106589288 A | 4/2017 |
| CN | 107099240 A | 8/2017 |
| CN | 110204786 A | 9/2019 |
| CN | 112357897 A | 2/2021 |
| CN | 112457824 A | 3/2021 |
| CN | 112574632 A | 3/2021 |
| CN | 112812257 A | 5/2021 |
| CN | 113122121 A | 7/2021 |
| CN | 113388308 A | 9/2021 |
| JP | 2012-064927 | * 3/2012 |
| WO | 2018183699 A1 | 10/2018 |
| WO | 2019220303 A1 | 11/2019 |

OTHER PUBLICATIONS

Shao Journal of Materials Chemistry Paper Supporting Information (Year: 2018).*
Shao Journal of Materials Chemistry Paper (Year: 2018).*
High Performance Polymers v. 33 p. 1132-1140, published Jun. 18, 2021 (Year: 2021).*
Espacenet Translation of CN 107602912 (Year: 2018).*
Odian Principles of Polymerization, Chapter 2, Polyurethane Section (Year: 2004).*
JPO Machine Translation of JP2012-064-927 (Mar. 29, 2012) (Year: 2012).*
Zhencai Qu et al., "Facile Construction of a Flexible Film with Ultrahigh Thermal Conductivity and Excellent Flame Retardancy for a Smart Fire Alarm", <Chemistry of Materials>, 2021,33(9), p. 3228-3240, Chinese Acad Sci, Guangzhou Inst Chem, Guangzhou 510650, Peoples R China.
Yu Guomin et al.,"Research Progress of Phosphorus Containing Flame Retardant Waterborne Polyurethane", <Henan Chemical Industry>, vol. 37 Issue 9, pp. 1-4, School of Materials & Chemical Engineering, Zhongyuan University of Technology, Zhengzhou 450007, China, Only Abstract in English.
Yu Han et al., "Research Progress of Waterborne Polyurethane Flame Retardants", <Leather Science and Engineering>, vol. 31, Issue 05, 2021, pp. 44-47, Research Center for Leather and Protein of College of Chemistry & Chemical Engineering, Yantai University, Yantai 264005, China, Only Abstract in English.
Jiang Yuncai et al., "Recent advances of nano black phosphorus in flame retardant", <,Phosphate & Compound Fertilizer>, vol. 36, No. 12, 2021, pp. 20-26, Faculty of Chemical Engineering, Kunming University of Science and Technology, Kunming 650500, China, Only Abstract in English.

* cited by examiner

*Primary Examiner* — Heidi R Kelley
*Assistant Examiner* — Adam J Berro

(57) ABSTRACT

This application relates to flame-retardant coatings, and more particularly to an aminated phosphorene-based flame-retardant waterborne polyurethane coating and a preparation method thereof. The aminated phosphorene-based flame-retardant waterborne polyurethane coating is prepared from a diisocyanate-terminated prepolymer, a neutralizer and an aminated phosphorene, where the diisocyanate-terminated prepolymer is prepared from polymeric diol with water-dispersible groups, aliphatic diisocyanate and carboxylic acid type hydrophilic diol under the catalysis of a catalyst for synthesizing waterborne polyurethane.

10 Claims, No Drawings

AMINATED PHOSPHORENE-BASED FLAME-RETARDANT WATERBORNE POLYURETHANE COATING AND PREPARATION METHOD THEREOF

CROSS-REFERENCE TO RELATED APPLICATIONS

This application claims the benefit of priority from Chinese Patent Application No. 202111079394.0, filed on Sep. 15, 2021. The content of the aforementioned application, including any intervening amendments thereto, is incorporated herein by reference in its entirety.

TECHNICAL FIELD

This application relates to flame-retardant coatings, and more particularly to an aminated phosphorene-based flame-retardant waterborne polyurethane coating and a preparation method thereof.

BACKGROUND

With the development of productivity and the continuous improvement of people's living standards, materials such as plastics, cotton fibers, artificial fibers, and wood have been increasingly applied to all aspects of life. However, due to the flammability, these materials are prone to trigger a fire and pose a safety hazard while being widely applied.

China has become more and more strict in the supervision of fire safety in recent years, and the market demand for the fire-retardant material is growing. Thus, how to effectively enhance the fire-retardant performance of the material has become one of the most concerned issues at present. Generally, there are three main methods to improve the flame-retardant performance of material, which are described as follows. (1) The material is mixed with the flame retardant agent by means of blending, which is low-cost and high-efficiency, but only suitable for thermoplastic materials. In addition, the doping of flame retardants into the material will affect the tensile modulus and elastic modulus of the material. (2) The flame-retardant groups are introduced into the material by means of chemical reaction. However, this method is not suitable for materials such as wood, cotton fiber, fabrics, and the introduction of flame-retardant groups will cause the variations of the physical properties, such as the melting point, density and glass transition temperature. (3) The flame-retardant coatings are used to coat the surface of the material, which not only avoids the influence on the physical properties of the material, but also has the functions of waterproofing, antibacterial, and beautifying modification.

However, the frequently-used flame-retardant coatings are solvent-based flame-retardant coatings, which not only generate volatile organic compounds (VOCs) in use, but also have the risk of flammability and explosion during storage and transportation. In order to overcome the defects of solvent-based flame-retardant coatings, Chinese patent application No. 201410804817.4 discloses a phosphorus-containing waterborne transparent fireproof polyurethane coating and a preparation method thereof. In the preparation method, a phosphorus-containing monomer is adopted to synthesize a polyurethane resin containing a flame-retardant element phosphorus on the molecular chain of the polyurethane resin by means of molecular design, and then the phosphorus-containing polyurethane resin is subjected to water-borne modification, so as to prepare the phosphorus-containing waterborne transparent fireproof polyurethane coating. The prepared phosphorus-containing waterborne transparent fireproof polyurethane coating meets the requirements of environmental protection and is not flammable and explosive, but it has poor flame-retardant effect, restricting the application.

SUMMARY

An objective of this application is to provide an aminated phosphorene-based flame-retardant waterborne polyurethane coating with excellent fire-retardant performance and a preparation method thereof to overcome the insufficient defects in the existing technologies.

Technical solutions of this application are described as follows.

In a first aspect, this application provides an aminated phosphorene-based flame-retardant waterborne polyurethane coating, wherein the aminated phosphorene-based flame-retardant waterborne polyurethane coating is prepared from a diisocyanate-terminated prepolymer, a neutralizer and an aminated phosphorene;

wherein the diisocyanate-terminated prepolymer is prepared from polymeric diol with water-dispersible groups, aliphatic diisocyanate, and carboxylic acid type hydrophilic diol under the catalysis of a catalyst;

wherein a molar ratio of the aliphatic diisocyanate to the polymeric diol with water-dispersible groups is (1.5-2):1;

a molar ratio of the carboxylic acid type hydrophilic diol to the polymeric diol with water-dispersible groups is (0.3-0.6):1;

the catalyst is configured to synthesize waterborne polyurethane; a mass ratio of the catalyst to the diisocyanate-terminated prepolymer is (0.0001-0.0002):1;

a molar ratio of the neutralizer to the carboxylic acid type hydrophilic diol is (0.8-1.2):1; and an amount of the aminated phosphorene is required to enable complete reaction of isocyanate groups.

In an embodiment, the polymeric diol with water-dispersible groups is selected from the group consisting of polypropylene glycol with a molecular weight of 1000~2000, polytetramethylene ether glycol (PTMG) with a molecular weight of 1000~2000, poly($\varepsilon$-caprolactone) diol with a molecular weight of 1000~2000, polycarbonate diol with a molecular weight of 1000~2000, poly(ethylene glycol adipate) diol with a molecular weight of 1000~2000, poly(adipic acid-1,4-butanediol ester) diol with a molecular weight of 1000~2000 and a combination thereof.

In an embodiment, the aliphatic diisocyanate is selected from the group consisting of isophorone diisocyanate, hexamethylene diisocyanate, cyclohexane di-methylene-diisocyanate and a combination thereof.

In an embodiment, the carboxylic acid type hydrophilic diol is selected from the group consisting of dihydroxymethylpropionic acid, dihydroxymethylbutyric acid, dihydroxysuccinic acid and a combination thereof.

In an embodiment, the catalyst is selected from the group consisting of tert-butylstannane, dibutyltin dilaurate and an organic bismuth catalyst;

In an embodiment, the neutralizer is selected from the group consisting of triethylamine, tripropylamine, triethanolamine, diethylenetriamine, 2-dimethylaminoethanol and a combination thereof.

In an embodiment, the aminated phosphorene is prepared from an amine substance and a black phosphorous crystal by ball milling.

In a second aspect, this application provides a method of preparing of the aminated phosphorene-based flame-retardant waterborne polyurethane coating mentioned above, comprising:

(S1) dissolving an amine substance in deoxygenated and deionized water, followed by addition of a black phosphorous crystal and ball milling via a ball mill to obtain a crude product; subjecting the crude product to grinding with a grinder, centrifugal separation, washing with ethanol and deoxygenated and deionized water and drying to constant weight, so as to obtain aminated phosphorene powder;

(S2) subjecting the polymeric diol with water-dispersible groups and the carboxylic acid type hydrophilic diol to vacuum heating to remove water, and reaction with the aliphatic diisocyanate under the catalysis of the catalyst to generate the diisocyanate-terminated prepolymer;

(S3) neutralizing the diisocyanate-terminated prepolymer with the neutralizer to obtain a neutralized diisocyanate-terminated prepolymer;

(S4) subjecting the neutralized diisocyanate-terminated prepolymer to a first chain extension with a part of an aqueous solution of aminated phosphorene powder to obtain an emulsion;

(S5) adding dropwise the rest of the aqueous solution of aminated phosphorene powder to the emulsion to perform a second chain extension to enable complete reaction of residual isocyanate groups, so as to obtain the aminated phosphorene-based flame-retardant waterborne polyurethane coating.

In an embodiment, in step (S1), a mass ratio of the amine substance to the black phosphorous crystal is (40-60):1; and the amine substance is selected from the group consisting of carbamide, ammonium chloride and tripolycyanamide; and
the ball milling is performed for 20-24 h; the grinding is performed for 3-5 h, and the drying is performed at 50-80° C.

In an embodiment, in step (S2), the vacuum heating is performed at 100-120° C., the reaction is performed at 75-85° C. for 3~4 h; and
in step (S3), the diisocyanate-terminated prepolymer is neutralized at 25-35° C. for 30-40 min.

In an embodiment, both of the first chain extension and the second chain extension are performed at 10-20° C. for 30-60 min; and a mass ratio of the aminated phosphorene powder used in the first chain extension to the aminated phosphorene powder used in the second chain extension is (1-2):(3-4).

Compared with the prior art, this application has the following beneficial effects.

With regard to this application, the neutralized diisocyanate-terminated prepolymer is subjected to chain extension with the aminated phosphorene, so as to introduce the black phosphorous to the flame-retardant waterborne polyurethane coating, achieving the VO-grade fire-retardant effect. Moreover, the aminated phosphorene-based flame-retardant waterborne polyurethane coating provided herein is free of the addition of any organic solvents, which meets the environmental-protection requirements, and eliminates the risk of flammability and explosion.

DETAILED DESCRIPTION OF EMBODIMENTS

In order to clearly explain the objectives, technical solutions and beneficial effects, this application will be described in detail below with reference to the embodiments. It should be understood that these embodiments are merely illustrative of this application, and are not intended to limit the scope of the disclosure.

Provided herein is an aminated phosphorene-based flame-retardant waterborne polyurethane coating. The aminated phosphorene-based flame-retardant waterborne polyurethane coating is prepared from a diisocyanate-terminated prepolymer, a neutralizer and an aminated phosphorene.

The diisocyanate-terminated prepolymer is prepared from polymeric diol with water-dispersible groups, aliphatic diisocyanate and carboxylic acid type hydrophilic diol under the catalysis of a catalyst. The polymeric diol with water-dispersible groups is selected from the group consisting of polypropylene glycol with a molecular weight of 1000~2000, polytetramethylene ether glycol (PTMG) with a molecular weight of 1000~2000, poly(&-caprolactone) diol with a molecular weight of 1000~2000, polycarbonate diol with a molecular weight of 1000~2000, poly(ethylene glycol adipate) diol with a molecular weight of 1000~2000, poly(adipic acid-1,4-butanediol ester) diol with a molecular weight of 1000~2000 and a combination thereof.

The aliphatic diisocyanate is selected from the group consisting of isophorone diisocyanate, hexamethylene diisocyanate, cyclohexane di-methylene-diisocyanate and a combination thereof. A molar ratio of the aliphatic diisocyanate to the polymeric diol with water-dispersible groups is (1.5-2):1.

The carboxylic acid type hydrophilic diol is selected from the group consisting of dihydroxymethylpropionic acid, dihydroxymethylbutyric acid, dihydroxysuccinic acid and a combination thereof. A molar ratio of the carboxylic acid type hydrophilic diol to the polymeric diol with water-dispersible groups is (0.3-0.6):1.

The catalyst is selected from the group consisting of tert-butylstannane, dibutyltin dilaurate and an organic bismuth catalyst. The catalyst is configured to synthesize waterborne polyurethane. A mass ratio of the catalyst to the diisocyanate-terminated prepolymer is (0.0001-0.0002):1.

The neutralizer is configured to neutralize the diisocyanate-terminated prepolymer. The neutralizer is selected from the group consisting of triethylamine, tripropylamine, triethanolamine, diethylenetriamine, 2-dimethylaminoethanol and a combination thereof. A molar ratio of the neutralizer to the carboxylic acid type hydrophilic diol is (0.8-1.2):1.

The aminated phosphorene is configured for chain extension of the diisocyanate-terminated prepolymer. The aminated phosphorene is prepared from an amine substance and a black phosphorous crystal by ball milling. The aminated phosphorene is required to enable complete reaction of isocyanate groups.

A method of preparing the aminated phosphorene-based flame-retardant waterborne polyurethane coating is performed as follows.

(S1) An amine substance is dissolved in deoxygenated and deionized water. The reaction mixture is added with a black phosphorous crystal, and then subjected to ball milling via a ball mill for 20-24 h to obtain a crude product, where a mass ratio of the amine substance to the black phosphorous crystal is (40-60):1 (preferably 50:1). The crude product is subjected to grinding with a grinder for 3-5 h, centrifugal separation, washing with ethanol and deoxygenated and deionized water and drying at 50-80° C. to constant weight, so as to obtain aminated phosphorene powder. The amine substance is selected from the group consisting of carbamide, ammonium chloride and melamine, preferably the carbamide.

The reaction is performed through the following mechanism:

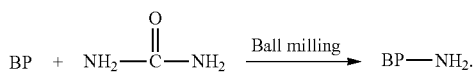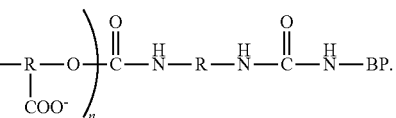

(S2) The polymeric diol with water-dispersible groups and the carboxylic acid type hydrophilic diol are subjected to vacuum heating at 100-120° C. (preferably 120° C.) to

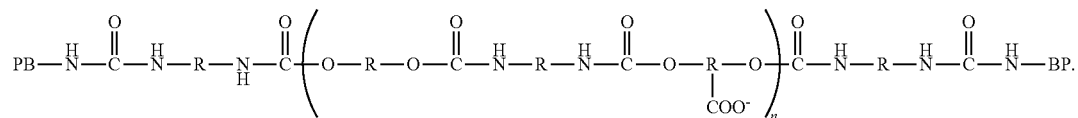

remove water, and reaction with the aliphatic diisocyanate under the catalysis of the catalyst at 75-85° C. for 3~4 h (preferably 85° C. for 3 h) to generate the diisocyanate-terminated prepolymer.

The reaction is performed as follows. The hydroxyl group (—OH) in the polymeric diol with water-dispersible groups and the carboxylic acid type hydrophilic diol and the isocyanate group (—NCO) in the aliphatic diisocyanate are subjected to condensation reaction to generate amino-ester structure (—NH—CO—O—), so as to generate the diisocyanate-terminated prepolymer. The reaction is performed through the mechanism shown as follows:

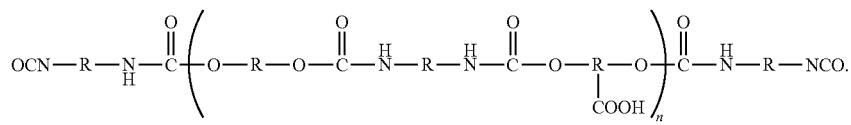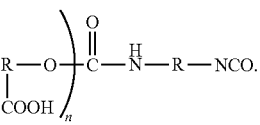

(S3) The diisocyanate-terminated prepolymer is neutralized at 25-35° C. for 30-40 min with the neutralizer to obtain a neutralized diisocyanate-terminated prepolymer.

The reaction is performed as follows. The carboxyl group (—COOH) are neutralized into the carboxyl anion (—COO—) for subsequent emulsification.

The reaction is performed through the following mechanism:

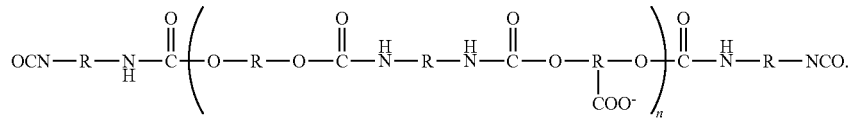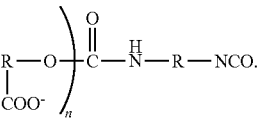

The neutralized diisocyanate-terminated prepolymer is subjected to a first chain extension with a part of an aqueous solution of aminated phosphorene powder at 10-20° C. for 30-60 min to obtain an emulsion;

(S5) The emulsion is added dropwise with the rest of the aqueous solution of aminated phosphorene powder to perform a second chain extension at 10-20° C. for 30-60 min to enable complete reaction of residual isocyanate groups, so as to obtain the aminated phosphorene-based flame-retardant waterborne polyurethane coating. A mass ratio of the aminated phosphorene powder used in the first chain extension to the aminated phosphorene powder used in the second chain extension is (1-2):(3-4).

The chain extension is performed through the following mechanism.

$NH_2$ group on BP—$NH_2$ is react with terminal group NCO to generate the carbamido group (—NH—CO—NH), such that the black phosphorus with good flame retardant effect is bonded to the polyurethane through covalent bond, followed by emulsification.

The mechanism of the chain extension is shown as follows:

The flame-retardant mechanism of the aminated phosphorene-based flame-retardant waterborne polyurethane coating provided herein includes two stages. In a first combustion stage below 450° C., considering that the black phosphorous crystal has remarkable heat resistance, it is possible to realize the delay of the heat transfer and exert a physical thermal barrier effect relying on the honeycomb structure in the black phosphorous crystal. In a second combustion stage above 450° C., the flame-retardant stage can be subdivided into two parts including a gas-phase flame-retardant part and a condensed-phase flame-retardant part. In the gas-phase flame-retardant part, black phosphorus is decomposed into P·, which can effectively capture free radicals (such as H· and OH·), reducing concentration and content of the free radicals. In the condensed-phase flame-retardant part, black phosphorus burns with oxygen to generate $P_xO_y$, followed by further reaction to generate phosphoric acid derivatives to promote the formation of carbon layers, which are configured to prevent the diffusion and intrusion of the combustible gas and heat, thereby improving the satisfactory flame-retardant effect.

Example 1

Provided herein was a preparation of the aminated phosphorene-based flame-retardant waterborne polyurethane coating, which was performed as follows.

(1) 100 g of the carbamide was dissolved in 300 mL of deoxygenated and deionized water. The reaction mixture was added with 2 g of a black phosphorous crystal, and then subjected to ball milling via a planetary ball mill for 24 h to obtain a crude product. The crude product was subjected to grinding with a grinder for 4 h, centrifugal separation, washing with ethanol and deoxygenated and deionized water 3 times and drying at 60° C. in a vacuum drying chamber to constant weight, so as to obtain the aminated phosphorene powder.

(2) The polytetramethylene ether glycol (PTMG) with a molecular weight of 1000 (40 g, 40 mmol) and the dihydroxymethylbutyric acid (2 g, 15 mmol) were subjected to vacuum heating at 120° C. to remove water in a reactor, and cooling to 60° C. Then, the reaction mixture was added with the isophorone diisocyanate (22 g, 100 mmol) for a reaction under the catalysis of the dibutyltin dilaurate at 85° C. for 3 h to generate the diisocyanate-terminated prepolymer.

(3) The reaction mixture was cooled to 50° C. The diisocyanate-terminated prepolymer was neutralized with the triethylamine (1.4 g, 14 mmol) for 30 min.

(4) When the reaction mixture was sequentially cooled below 35° C., an aqueous solution dissolved with 0.2 g of the aminated phosphorene was added to the reactor to perform the emulsification and the first chain extension for 30 min.

(5) The reaction mixture was added with an aqueous solution dissolved with 0.3 g of the aminated phosphorene to perform the second chain extension for 1 h. Then, the reaction mixture was cooled to room temperature to obtain the aminated phosphorene-based flame-retardant waterborne polyurethane coating.

Example 2

Provided herein was a preparation of the aminated phosphorene-based flame-retardant waterborne polyurethane coating, which was performed as follows.

(1) 50 g of the carbamide was dissolved in 150 mL of deoxygenated and deionized water. The reaction mixture was added with 1 g of a black phosphorous crystal, and then subjected to ball milling via a planetary ball mill for 20 h to obtain a crude product. The crude product was subjected to grinding with a grinder for 5 h, centrifugal separation, washing with ethanol and deoxygenated and deionized water 2 times and drying at 80° C. in a vacuum drying chamber to obtain the aminated phosphorene powder.

(2) 5 g of the polytetramethylene ether glycol (PTMG) with a molecular weight of 1000, 5 g of the poly(&-caprolactone) diol with a molecular weight of 1000 and 0.45 g of the dihydroxymethylbutyric acid were subjected to vacuum heating at 110° C. to remove water in a reactor, and cooling to 60° C. Then, the reaction mixture was added with 5 g of the isophorone diisocyanate for a reaction under the catalysis of the dibutyltin dilaurate at 85° C. for 3 h to generate the diisocyanate-terminated prepolymer.

(3) The reaction mixture was cooled to 45° C. The diisocyanate-terminated prepolymer was neutralized with 0.25 g of the diethylenetriamine for 30 min.

(4) When the reaction mixture was sequentially cooled below 30° C., an aqueous solution dissolved with 0.1 g of the aminated phosphorene was added to the reactor to perform the emulsification and the first chain extension for 60 min.

(5) The reaction mixture was added with an aqueous solution dissolved with 0.4 g of the aminated phosphorene to perform the second chain extension for 1 h. Then, the reaction mixture was cooled to room temperature to obtain the aminated phosphorene-based flame-retardant waterborne polyurethane coating.

Example 3

The method of preparing the aminated phosphorene-based flame-retardant waterborne polyurethane coating provided in this example are basically the same as that in Example 1, except for that in step (1), 80 g of the carbamide was dissolved in 240 mL of deoxygenated and deionized water, then the reaction mixture was added with 2 g of a black phosphorous crystal, that is, a mass ratio of the carbamide to the black phosphorous crystal was 40:1. Other features failed to be explained in this example adopts the explanations described in Example 1, and are not repeated herein.

Example 4

The method of preparing the aminated phosphorene-based flame-retardant waterborne polyurethane coating provided in this example are basically the same as that in Example 1, except for that in step (1), 120 g of the carbamide was dissolved in 360 mL of deoxygenated and deionized water, then the reaction mixture was added with 2 g of a black phosphorous crystal, that is, a mass ratio of the carbamide to the black phosphorous crystal was 60:1. Other features failed to be explained in this example adopts the explanations described in Example 1, and are not repeated herein.

Example 5

The method of preparing the aminated phosphorene-based flame-retardant waterborne polyurethane coating provided in this example are basically the same as that in Example 1, except for that in step (2), the vacuum heating was performed at 110° C. Other features failed to be explained in this example adopts the explanations described in Example 1, and are not repeated herein.

Example 6

The method of preparing the aminated phosphorene-based flame-retardant waterborne polyurethane coating provided in this example are basically the same as that in Example 1, except for that in step (2), the vacuum heating was performed at 100° C. Other features failed to be explained in this example adopts the explanations described in Example 1, and are not repeated herein.

Example 7

The method of preparing the aminated phosphorene-based flame-retardant waterborne polyurethane coating provided in this example are basically the same as that in Example 1, except for that in step (2), the reaction was performed at 80° C. for 3.5 h. Other features failed to be explained in this example adopts the explanations described in Example 1, and are not repeated herein.

Example 8

The method of preparing the aminated phosphorene-based flame-retardant waterborne polyurethane coating provided in this example are basically the same as that in Example 1, except for that in step (2), the reaction was performed at 75° C. for 4 h. Other features failed to be explained in this example adopts the explanations described in Example 1, and are not repeated herein.

Comparative Example 1

Chinese patent application publication No. 201410804817.4 provides a phosphorus-containing waterborne transparent fireproof polyurethane coating and a preparation method thereof.

The flame-retardant waterborne polyurethane coating obtained in Examples 1-8 and Comparative Example 1 were respectively coated on the wood surfaces with the same size and material. Moreover, the coating amount was the same. Each wood is then ignited individually for up to 10 s, and then the flame-retardant effect of the material obtained in each of Examples 1-8 and Comparative Example 1 is observed, and the results are exhibited in Table 1.

TABLE 1

Flame-retardant effect of material obtained in each of Examples 1-8 and Comparative Example 1

| | Flame extinction time | Whether wood is damaged | Flame-retardant grades |
|---|---|---|---|
| Example 1 | 5 s off | The wood is in good condition without fallen burning material | V0 |
| Example 2 | 13 s off | The wood is in good condition without fallen burning material | V0 |
| Example 3 | 25 s off | The wood is in good condition without fallen burning material | V0 |
| Example 4 | 30 s off | The wood is in good condition without fallen burning material | V0 |
| Example 5 | 11 s off | The wood is in good condition without fallen burning material | V0 |
| Example 6 | 15 s off | The wood is in good condition without fallen burning material | V0 |
| Example 7 | 20 s off | The wood is in good condition without fallen burning material | V0 |
| Example 8 | 22 s off | The wood is in good condition without fallen burning material | V0 |
| Comparative Example 1 | 120 s off | The wood is in damaged severely with lots of fallen burning materials | V2 |

It is demonstrated from Table 1 that compared with the flame-retardant waterborne polyurethane coatings in the prior art, the aminated phosphorene-based flame-retardant waterborne polyurethane coating provided herein has more excellent flame-retardant effect. Moreover, the flame-retardant coating prepared under the preparation conditions set in Example 1 has the best flame-retardant performance.

It should be noted that the above embodiments are merely intended illustrate the technical solutions of this application, but not limit this application. Although this application is described in detail with reference to the preferred embodiments, it should be understood by those skilled in the art that any modifications or equivalent replacements made without departing from the spirit shall fall within the scope of the present application defined by the appended claims.

What is claimed is:

1. An aminated phosphorene-based flame-retardant waterborne polyurethane coating, wherein components of the aminated phosphorene-based flame-retardant waterborne polyurethane coating consist of a diisocyanate-terminated prepolymer, a neutralizer and an aminated phosphorene;
wherein the diisocyanate-terminated prepolymer is prepared from raw materials consisting of polymeric diol with water-dispersible groups, aliphatic diisocyanate, and carboxylic acid type hydrophilic diol under the catalysis of a catalyst;
wherein a molar ratio of the aliphatic diisocyanate to the polymeric diol with water-dispersible groups is (1.5-2):1;
a molar ratio of the carboxylic acid type hydrophilic diol to the polymeric diol with water-dispersible groups is (0.3-0.6):1;
the catalyst is configured to synthesize waterborne polyurethane; a mass ratio of the catalyst to the diisocyanate-terminated prepolymer is (0.0001-0.0002):1;
a molar ratio of the neutralizer to the carboxylic acid type hydrophilic diol is (0.8-1.2):1; and
an amount of the aminated phosphorene is required to enable complete reaction of isocyanate groups.

2. The aminated phosphorene-based flame-retardant waterborne polyurethane coating of claim 1, wherein the polymeric diol with water-dispersible groups is selected from the group consisting of polypropylene glycol with a molecular weight of 1000~2000, polytetramethylene ether glycol (PTMG) with a molecular weight of 1000~2000, poly(ε-caprolactone) diol with a molecular weight of 1000~2000, polycarbonate diol with a molecular weight of 1000~2000, poly(ethylene glycol adipate) diol with a molecular weight of 1000~2000, poly(adipic acid-1,4-butanediol ester) diol with a molecular weight of 1000~2000 and a combination thereof.

3. The aminated phosphorene-based flame-retardant waterborne polyurethane coating of claim 1, wherein the aliphatic diisocyanate is selected from the group consisting of isophorone diisocyanate, hexamethylene diisocyanate, cyclohexane di-methylene-diisocyanate and a combination thereof.

4. The aminated phosphorene-based flame-retardant waterborne polyurethane coating of claim 1, wherein the carboxylic acid type hydrophilic diol is selected from the group consisting of dihydroxymethylpropionic acid, dihydroxymethylbutyric acid, dihydroxysuccinic acid and a combination thereof.

5. The aminated phosphorene-based flame-retardant waterborne polyurethane coating of claim 1, wherein the catalyst is selected from the group consisting of tert-butylstannane, dibutyltin dilaurate and an organic bismuth catalyst;

the neutralizer is selected from the group consisting of triethylamine, tripropylamine, triethanolamine, diethylenetriamine, 2-dimethylaminoethanol and a combination thereof.

6. The aminated phosphorene-based flame-retardant waterborne polyurethane coating of claim 1, wherein the aminated phosphorene is prepared from an amine substance and a black phosphorous crystal by ball milling.

7. A method of preparing the aminated phosphorene-based flame-retardant waterborne polyurethane coating of claim 1, comprising:
(S1) dissolving an amine substance in deoxygenated and deionized water, followed by addition of a black phosphorous crystal and ball milling via a ball mill to obtain a crude product; subjecting the crude product to grinding with a grinder, centrifugal separation, washing with ethanol and deoxygenated and deionized water and drying to constant weight, so as to obtain aminated phosphorene powder;
(S2) subjecting the polymeric diol with water-dispersible groups and the carboxylic acid type hydrophilic diol to vacuum heating to remove water, and reaction with the aliphatic diisocyanate under the catalysis of the catalyst to generate the diisocyanate-terminated prepolymer;
(S3) neutralizing the diisocyanate-terminated prepolymer with the neutralizer to obtain a neutralized diisocyanate-terminated prepolymer;
(S4) subjecting the neutralized diisocyanate-terminated prepolymer to a first chain extension with a part of an aqueous solution of aminated phosphorene powder to obtain an emulsion;
(S5) adding dropwise the rest of the aqueous solution of aminated phosphorene powder to the emulsion to perform a second chain extension to enable complete reaction of residual isocyanate groups, so as to obtain the aminated phosphorene-based flame-retardant waterborne polyurethane coating.

8. The method of claim 7, wherein in step (S1), a mass ratio of the amine substance to the black phosphorous crystal is (40-60):1; and the amine substance is selected from the group consisting of carbamide, ammonium chloride and tripolycyanamide; and
the ball milling is performed for 20-24 h; the grinding is performed for 3-5 h, and the drying is performed at 50-80° C.

9. The method of claim 7, wherein in step (S2), the vacuum heating is performed at 100-120° C., the reaction is performed at 75-85° C. for 3~4 h; and
in step (S3), the diisocyanate-terminated prepolymer is neutralized at 25-35° C. for 30-40 min.

10. The method of claim 7, wherein both of the first chain extension and the second chain extension are performed at 10-20° C. for 30-60 min; and a mass ratio of the aminated phosphorene powder used in the first chain extension to the aminated phosphorene powder used in the second chain extension is (1-2):(3-4).

* * * * *